(12) United States Patent
Cho et al.

(10) Patent No.: US 12,717,785 B2
(45) Date of Patent: Aug. 25, 2026

(54) MULTI-TABLE SCAN SEMI-JOIN DATABASE OPTIMIZATION

(71) Applicant: SAP SE, Walldorf (DE)

(72) Inventors: Sukhyeun Cho, Incheon (KR); Sumin Ko, Incheon (KR)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 18/885,402

(22) Filed: Sep. 13, 2024

(65) Prior Publication Data

US 2026/0079939 A1 Mar. 19, 2026

(51) Int. Cl.

| | |
|---|---|
| ***G06F 15/16*** | (2006.01) |
| ***G06F 16/2453*** | (2019.01) |
| ***G06F 16/2455*** | (2019.01) |

(52) U.S. Cl.

CPC .. *G06F 16/24544* (2019.01); *G06F 16/24545* (2019.01); *G06F 16/2456* (2019.01)

(58) Field of Classification Search

None

See application file for complete search history.

(56) References Cited

U.S. PATENT DOCUMENTS

| | | | | |
|---|---|---|---|---|
| 12,210,526 B1 * | 1/2025 | Cho | ................. | G06F 16/24539 |
| 2007/0027860 A1 * | 2/2007 | Bestgen | ........... | G06F 16/24544 707/999.005 |
| 2014/0214796 A1 * | 7/2014 | Barber | ............ | G06F 16/24544 707/714 |
| 2020/0341981 A1 * | 10/2020 | Fender | ............ | G06F 16/24544 |

* cited by examiner

*Primary Examiner* — Alex Gofman

(74) *Attorney, Agent, or Firm* — Mintz Levin Cohn Ferris Glovsky and Popeo, P.C.

(57) ABSTRACT

In some embodiments, there is provided generating a logical query plan for a query that includes a single fact table and multiple reducer tables; optimizing the logical query plan for query execution; and executing the optimized logical query plan.

15 Claims, 14 Drawing Sheets

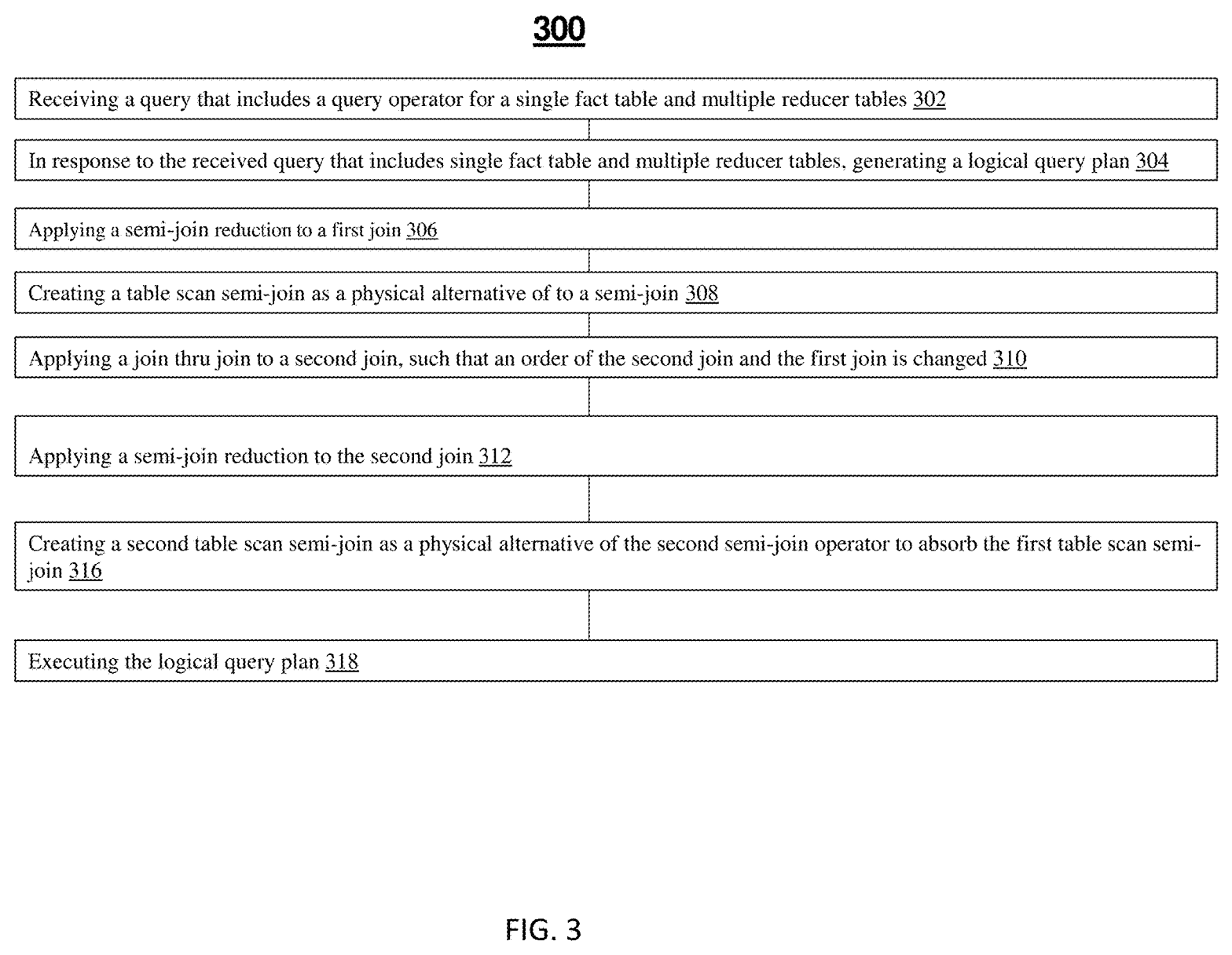

300

Receiving a query that includes a query operator for a single fact table and multiple reducer tables 302

In response to the received query that includes single fact table and multiple reducer tables, generating a logical query plan 304

Applying a semi-join reduction to a first join 306

Creating a table scan semi-join as a physical alternative of to a semi-join 308

Applying a join thru join to a second join, such that an order of the second join and the first join is changed 310

Applying a semi-join reduction to the second join 312

Creating a second table scan semi-join as a physical alternative of the second semi-join operator to absorb the first table scan semi-join 316

Executing the logical query plan 318

FIG. 3

486
Join1 (Fact1.A = Dim1.A)
Transparent View1
Dim1
487
Join2 (Fact1.B = Dim2.B)
Dim2
Table Scan Semi Join(Fact 1)
Semi Join1 (Fact1.A = Dim1.A)
Fact1
494B
Join Thru Join rule
492
494A

MULTI-TABLE SCAN SEMI-JOIN DATABASE OPTIMIZATION

TECHNICAL FIELD

The subject matter described herein relates generally to optimizing database query execution.

BACKGROUND

A database may be configured to store a plurality of electronic data records. These data records may be organized, in accordance with a database schema, into various database objects including, for example, one or more database tables. The database is coupled with a database management system (DBMS), which may be configured to support a variety of database operations for accessing the data records stored in the database. These database operations may include, for example, structured query language (SQL) queries and/or the like.

SUMMARY

In some embodiments, there is provided generating a logical query plan for a query that includes a single fact table and multiple reducer tables; optimizing the logical query plan for query execution by at least: applying to the logical query plan a first semi-join reduction to a first join that joins the single fact table with at least a first reducer table, creating a first table scan semi-join as a physical alternative to a first semi-join operator formed by the first semi-join reduction, applying a join thru join to a second join to change an order of the first join operator and a second join operator in the logical query plan, and applying a second semi-join reduction to the second join operator above the first semi-join operator, and creating a second table scan semi-join as a physical alternative of the second semi-join operator to absorb the first table scan semi-join; and executing the optimized logical query plan.

In some implementations, the current subject matter includes one or more of the following optional features. The query may include a join of the single fact table with each of the multiple reducer tables. There may also be provided receiving the query that includes a query operator for the single fact table and the multiple reducer tables including the first reducer table. The logical query plan may be generated in response to the received query. The generating the logical query plan may include generating an abstract syntax tree including the single fact table and the multiple reducer tables. The first semi-join reduction may be applied to the first join that joins the single fact table with at least the first reducer table reduces a quantity of rows from the single fact table provided to the first join when joined with the first reducer table. The first table scan semi-join may be registered as the physical alternative to the semi-join operator to enable execution of the table scan semi-join at the executing of the optimized logical query plan.

Implementations of the current subject matter can include methods, such as a computer-implemented method consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer readable storage medium (or, e.g., machine-readable storage medium) may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

FIG. 3 depicts an example of an optimization process for handling multi-table joins, in accordance with some embodiments;

When practical, similar reference numbers denote similar structures, features, or elements.

DETAILED DESCRIPTION

In some database management systems, the database engine may not be able to repeatedly apply a semi-join reduction on a common target, such as a target table, using multiple reducers, such as reducer tables. When this is the case, the database management system may not be able to optimize this type of query for execution.

Figure 1A:
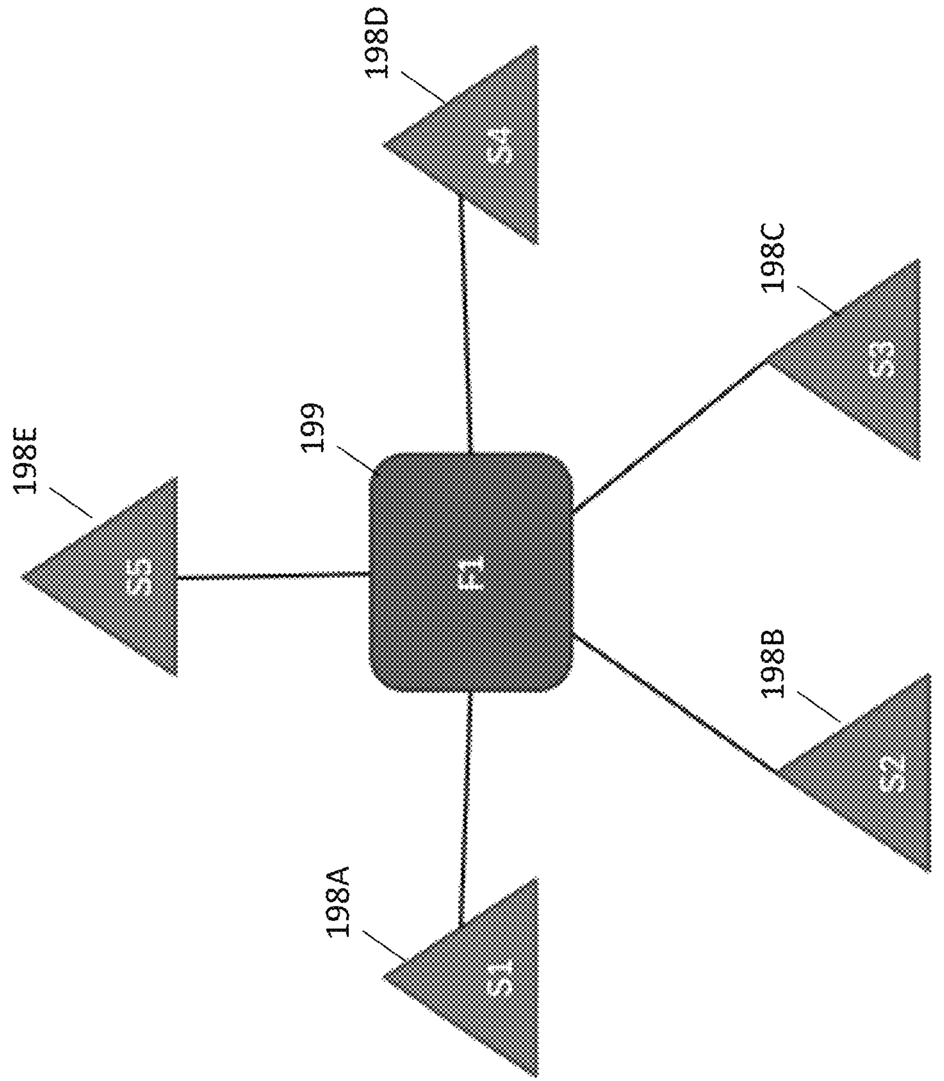
FIG. 1A depicts a logical representation of a common target table with multiple reducer tables, in accordance with some embodiment.

FIG. 1A depicts an example of a common target, such as a fact table F1 199 with multiple reducer tables, such as tables SC 198A, S2 198B, S3 198C, S4 198D, and S5 198E.

In the example of FIG. 1A, a query is configured to join the fact table F1 199 with the plurality of reducer tables S1-S5 198A-E, so as noted above a database management system may not be able to handle optimization of this type of query for execution. The phrase "semi-join" refers to a database operation that selects a set of tuples from one relation, such as the fact table F1, that match one or more tuples from another relation(s), such as S1-S5, on the joining domains.

If semi-join reduction cannot be applied to optimize execution of the common target table F1 199 using the multiple reducers S1-S5 198A-E, the query will not be optimized for execution at runtime. If however the semi-join reduction can be applied to all of the joins associated with FIG. 1A and a table scan semi-join can also be used on the newly created semi-joins (e.g., using multi-children table scan semi-join), the original joins on the large fact table can be executed more effectively.

In some embodiments, there is provided query optimization that includes applying multiple applications of the semi-join reduction on a common table, such as fact table F1 of FIG. 1A, using multiple reducers, such as reducers S1-S5. In the presence of several joins in a query plan, the semi-join reduction is applied to the lowest join to create a new semi-join below itself and the reducer of the bottom join. The order between the bottom join and the one immediately above it is then rearranged to open the way for the application of the semi-join reduction to an upper join and the generation of another semi-join (e.g., a semi-join between the subtree including the newly created semi-join having the fact table and the reducer table of the bottom join as its children, and the reducer of the upper join). In this way, the order of standard joins is repeatedly or continuously altered, and the semi-join reduction is applied to them to produce a series of stacked semi-joins.

In a database query optimizer, enumeration may be logical or physical. Logical enumeration is an enumeration of the format of a logical tree (such as an abstract syntax tree or other type of logical tree which may be used to represent the query plan such as FIGS. 1B, 1C, and the like). The logical enumeration may produce a plurality of query plan trees by adding new operators, removing inefficient operators, or changing the order of operators to find a best (e.g., optimized) plan with a lowest cost, which is determined after finishing the physical enumeration on the various logical trees. Physical enumeration is in some respects similar to logical enumeration, but while logical enumerators help generate alternatives with a different logical structure and order of the operators, physical enumeration enumerates the database execution engine algorithms to logical operators and based on the algorithms, the cost of each operator and each subplan is calculated.

Alternatively, or additionally, the enumeration of the table scan semi-join operator may also be provided in accordance with some embodiments. For a semi join created by applying the semi join reduction rule on a join, the table scan semi-join (TSSJ) is registered as the semi-join's physical alternative (which indicated that the TSSJ will be used at query execution time). This process is repeated for the semi-joins above it on the condition that the physical alternative of its child semi-join has been registered as a table scan semi-join. If this condition is met, a new table scan semi-join is created to absorb a preceding table scan semi-join of a child semi-join and is registered as the physical alternative of the parent semi-join.

Before providing additional description with respect to applying multiple applications of the semi-join reduction on a common table using multiple reducers, the following provides additional description for semi-join reduction, table scan semi-join, and multi-children table scan semi-joins.

Figures 1B, 1C:
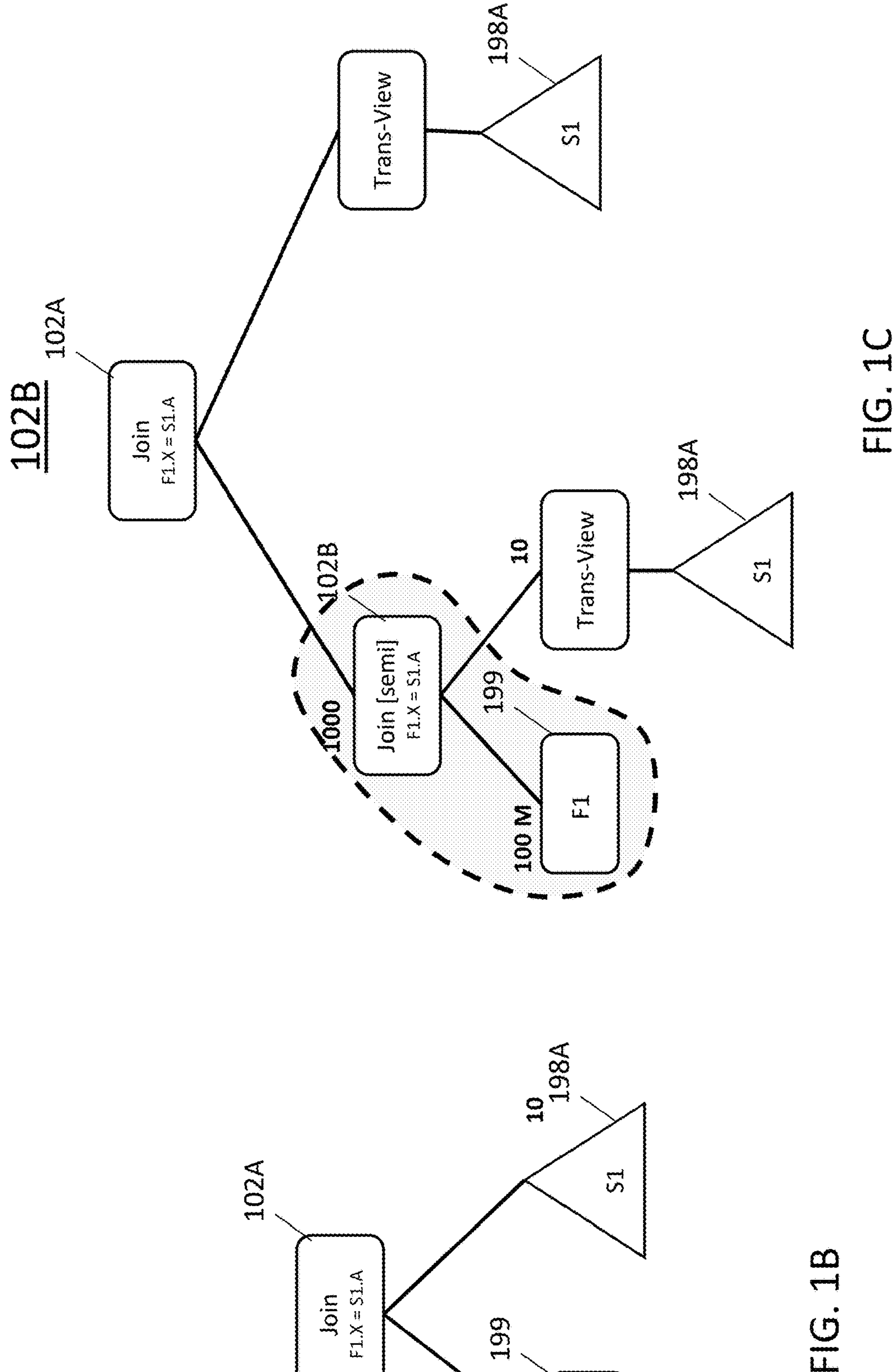
FIGS. 1B-1C depict an example of a semi-join reduction, in accordance with some embodiments.

FIGS. 1B-1C depict an example of a semi-join reduction, in accordance with some embodiments. The semi-join reduction is a way to optimize a join 102A when one of the two tables, such as table F1 199, is larger than the other table, such as S1 198A. Referring to FIG. 1B, the table F1 may correspond to a large table (e.g., 100 million rows), while table S1 only includes 10 rows. When the semi-join reduction is applied to F1 as its target table and S1 as its reducer, a new semi-join 102B is created as shown at FIG. 1C. This semi-join 102B only transmits rows from table F1 that have a match to those from S1. This may significantly reduce the size of resulting rows from the target F1. In the example of FIG. 1C, only 1,000 rows would need to be sent to the join 102A, as opposed to 100 million rows at FIG. 1B without the application of this semi-join reduction.

Figure 1D:
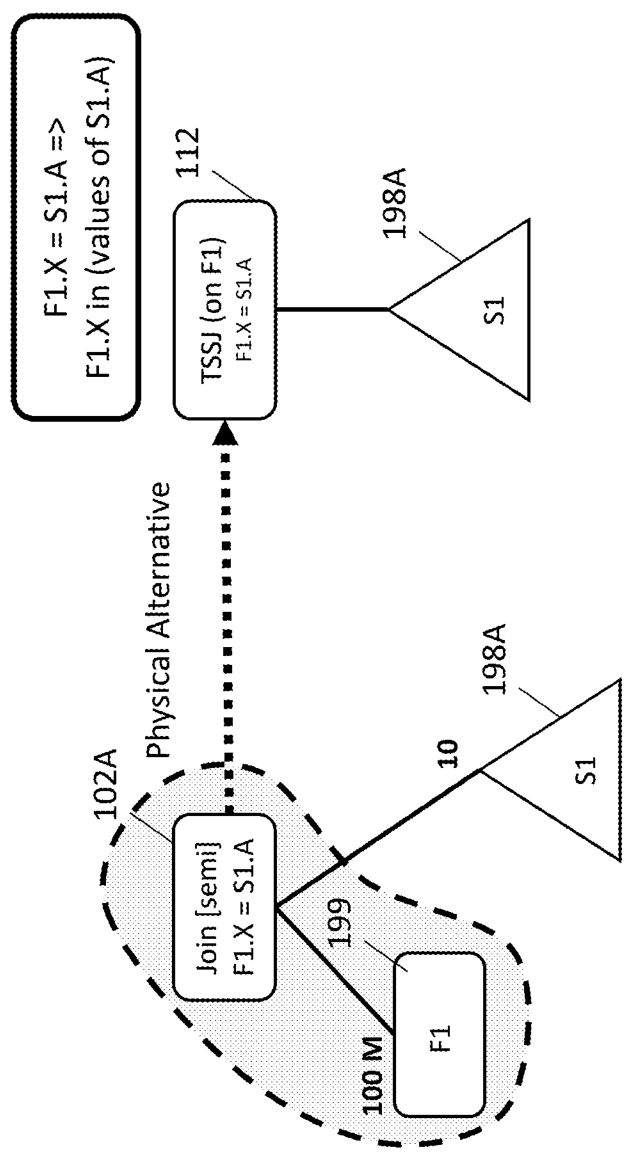
FIG. 1D depicts an example of a table scan semi-join (TSSJ) operator, in accordance with some embodiments.

FIG. 1D depicts an example of a table scan semi-join (TSSJ) operator, in accordance with some embodiments. When a semi-join is expected to significantly diminish a size of a target table F1 199, a table scan semi-join 112 operator may be used as a physical operator during query plan execution of the semi-join. The table scan semi-join 112 acts as an actual execution algorithm for conducting the join. In the example of FIG. 1D, the semi-join on table F1 is transformed into a table scan semi-join for execution. The phrase "table scan semi-join" refers to a physical operator (e.g., which is executed at runtime) that converts the reducer side, such as table S1 198B into a local filter of a table scan of the larger table F1 (e.g., into an in list of the table F1). The table scan semi-join may thus provide an advantage in its ability to execute the join condition directly on the table F1, rather than on intermediate results from the table F1, which may provide performance improvements. Additionally, the table scan semi-join allows for the efficient arrangement of the order of the join condition and local filters, thereby enabling more effective execution of table filtering.

Figure 1E:
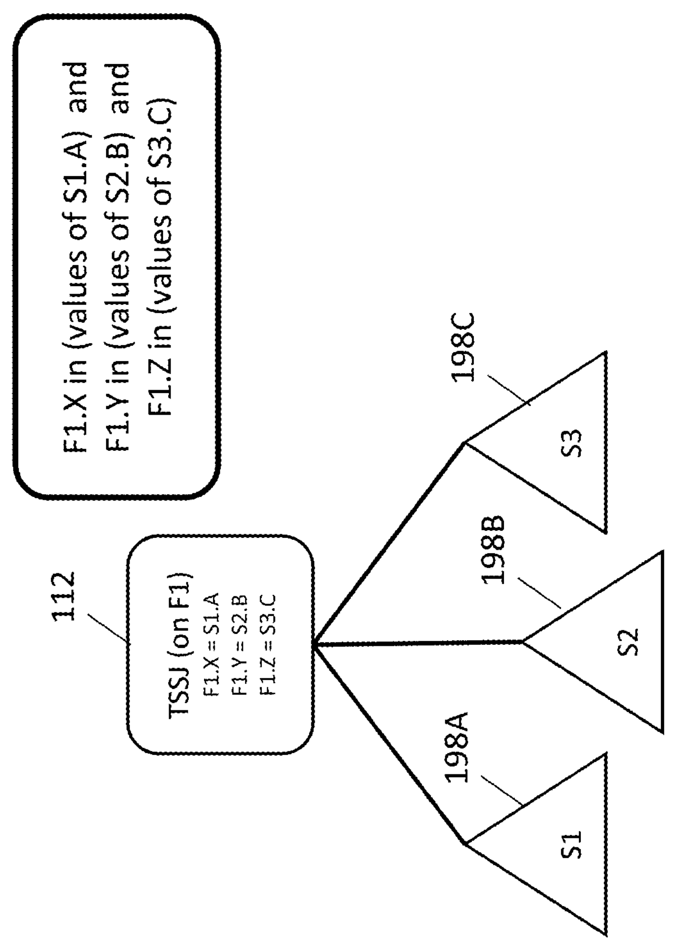
FIG. 1E shows an example of a multi-children table scan semi-join, in accordance with some embodiments.

FIG. 1E shows an example of a multi-children table scan semi-join, in accordance with some embodiments. For example, the multi-children table scan semi-join is a table scan semi-join 112 with multiple reducer tables, such as S1 198A, S2 198B, and S3 198C. During execution of the table scan semi-join 112, the size of the target table F1 is filtered by the multiple reducer tables, such as S1 198A, S2 198B, and S3 198C, so the target table F1 is diminished in size through the filtering due to the multiple reducer tables (e.g., via in lists originating from reducers). Moreover, the filters for the reducers are organized efficiently according to their selectivity and other attributes.

Referring again to FIG. 1A, to manage a query involving joins between a large fact table F1 and multiple reducers S1-S5, a query optimizer may perform a semi-join reduction as noted above. The semi-join reduction may be applied to the fact table F1 multiple times using each of the different reducers, S1-S5. However, this strategy may be applicable with only one join without any proper representation method for multiple reducers in the search space, so as some best plan candidates are given up due to the limitation of the representation.

Rather than deciding how many joins to apply semi-join reduction in an entire query plan and applying the semi-join reduction rule for the pre-selected join set all at once, the query optimizer may, in accordance with some embodiments, ascertain the semi-join reduction applicability on the fly from the bottom to top of the query plan's tree. Moreover, this bottom to top determination with respect to the query plan (or its tree) may be combined with frequently or constantly accumulating semi-joins (when possible). This improved optimization process not only facilitates the incorporation of semi-joins from the semi-join reduction into the entire enumeration search space of cost-based optimization but also aids in selecting an optimal query plan among candidate query plans based on cost calculations.

Before providing additional description related to the query optimization, the following provides an example of a system in which the query optimization may be practiced.

Figure 2:
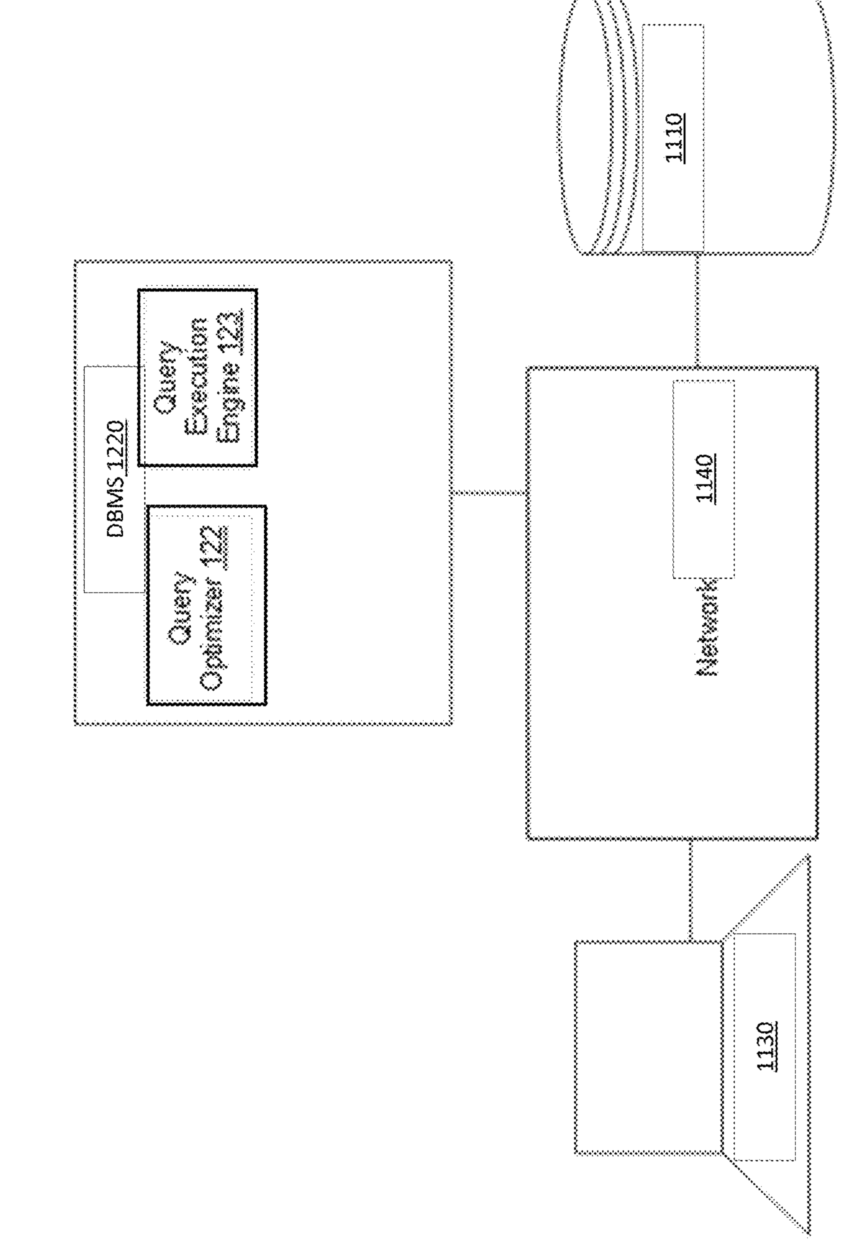
FIG. 2 depicts an example of a computing system 200, in accordance with some example embodiments.

FIG. 2 depicts an example of a computing system 200, in accordance with some example embodiments. Referring to FIG. 2, the computing system 200 may include a database 1110, a database management system (DBMS) 1220, and a client device 1130. For example, the database management system 1220 may include a query optimizer 122, a query execution engine 123, and other components or functions. It is noted that while only a single database 1110 and a single client device 1130 are shown, this is merely to avoid cluttering the figure as other quantities of client devices, databases, and the like may be implemented as well. It should be appreciated that database 1110 is representative of any number of databases 1110 (e.g., row store, column store, hybrid row/column store, etc.), and client device 1130 is representative of any number of client devices that may include as part of computing system 200.

From an application or client perspective, it can be extremely cumbersome to access databases such as database 1110. For example, an application may need to query different types of databases using complex queries. As a consequence, the application layer in this example would need to be configured to handle the various types of databases and the various query types. Additionally, or alternatively, each database 1110 may need to process queries from the application into a format and structure that can be handled by a given database. Pushing complex operations and support for a variety of different database types to the application layer may contravene the need to have relatively lighter weight and/or readily deployable applications. On the other hand, pushing complex operations to the database layer where data is stored may draw processing and/or memory resources at the database 1110 and may thus reduce the performance and response times for queries on that database layer.

In some example implementations, the query execution engine 123 (also referred to as a database execution engine) may be used to decouple the higher-level, application layer from the database layer (e.g., the persistence or storage layer where data including database tables may be stored and/or queried using instructions, such as commands and/or the like). The query execution engine 123 may be implemented separately from the database layer (e.g., at database 1110) and/or the application layer, although the query execution may be implemented as part of the application or database as well. Further, the query execution engine 123 may be configured to receive executable code from query compiler, applies minor optimizations on it, and executes the plan, which can be executed at runtime. Alternatively, or additionally, the query optimizer 122 may receive a query, generate a query plan (including for example query algebra), optimize the query plan, and/or the like. The executable code (generated by the query execution engine) may be in the form of pre-compiled code (which can be selected for certain operations in the query plan) and/or code that is generated just-in-time at query execution specifically for execution of the query plan.

The database 1110, the database management system 1220, and the client device 1130 may be communicatively coupled via a network 1140. In some example embodiments, the database 1110 may be a relational database. However, it should be appreciated that the database 1110 may be any type of database including, for example, an in-memory database, a hierarchical database, an object database, an object-relational database, and/or the like. For example, instead of and/or in addition to being a relational database, the database 1110 may be a graph database, a column store, a row store, a hybrid store (e.g., support for row and column storage of tables), a key-value store, a document store, and/or the like.

The database management system 1220 may be configured to respond to requests from one or more client devices including, for example, the client device 1130. For example, as shown in FIG. 2, the client device 1130 may communicate with the database management system 1220 via the network 1140, which may be any wired and/or wireless network including, for example, a public land mobile network (PLMN), a wide area network (WAN), a local area network (LAN), a virtual local area network (VLAN), the Internet, and/or the like. The client device 1130 may be a processor-based device including, for example, a smartphone, a tablet computer, a wearable apparatus, a virtual assistant, an Internet-of-Things (IoT) appliance, and/or the like.

FIG. 3 depicts an example process 300 for query optimization, in accordance with some embodiments.

At 302, the database management system 1220 may receive a query that includes a query operator for a single fact table and multiple reducer tables, in accordance with some embodiments. For example, the database management system may receive the following query: select from Fact1 join Dim 1 on Fact 1.A=Dim1A join DIM2 on Fact 1.B=DIM2.B. In this example, the single fact table is Fact1 table, such as table F1 199 of FIG. 1A, wherein the reducer tables are for example Dim1, Dim2, and the like, such as reducer tables S1 198A and S2 198B. When this type of query is received or processed, the query is detected for query optimization with respect to the noted issues with semi-join reduction on a common target using multiple reducers. Although the example refers to a "single fact table" with multiple reducers, there may be other fact tables with corresponding reducer tables as well.

Figure 4A:
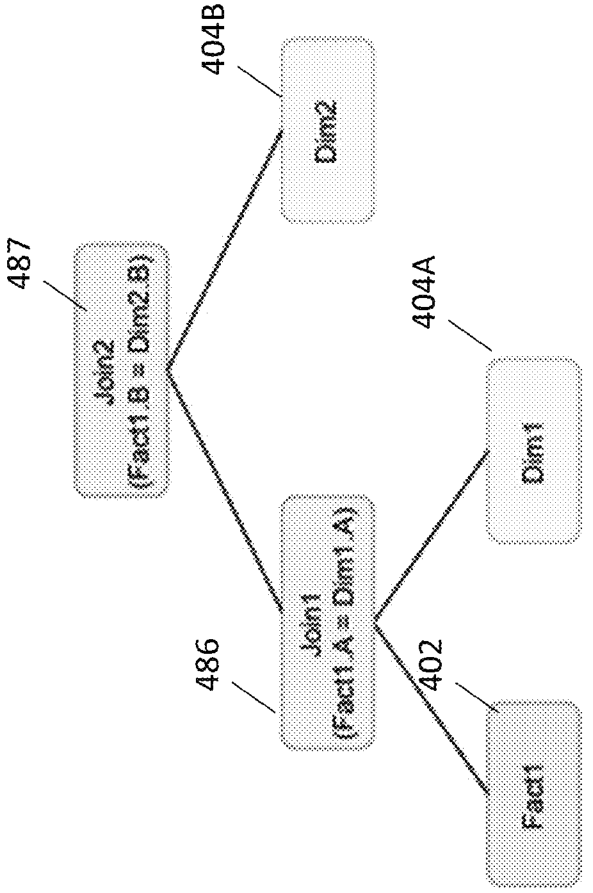
FIGS. 4A, 4B, 4C, 4D, 4E, and 4F depict example of logical query plans, in accordance with some example embodiments.

At 304, in response to the received query that includes single fact table and multiple reducer tables, a logical query plan is generated. For example, the query optimizer 122 may generate at least one logical query plan for the received query. An example of a logical query plan that is generated for the received query is depicted at FIG. 4A. Referring to FIG. 4A, the query plan may be represented as a tree (e.g., an abstract syntax tree) including a fact table 402 (Fact1) and two reducer tables, such as Dim1 404A and Dim2 404B. The first join (Join1) 486 joins fact table Fact1 and Dim1, and the second join (Join2) 487 joins the output of Join1 with Dim2.

Figure 4B:
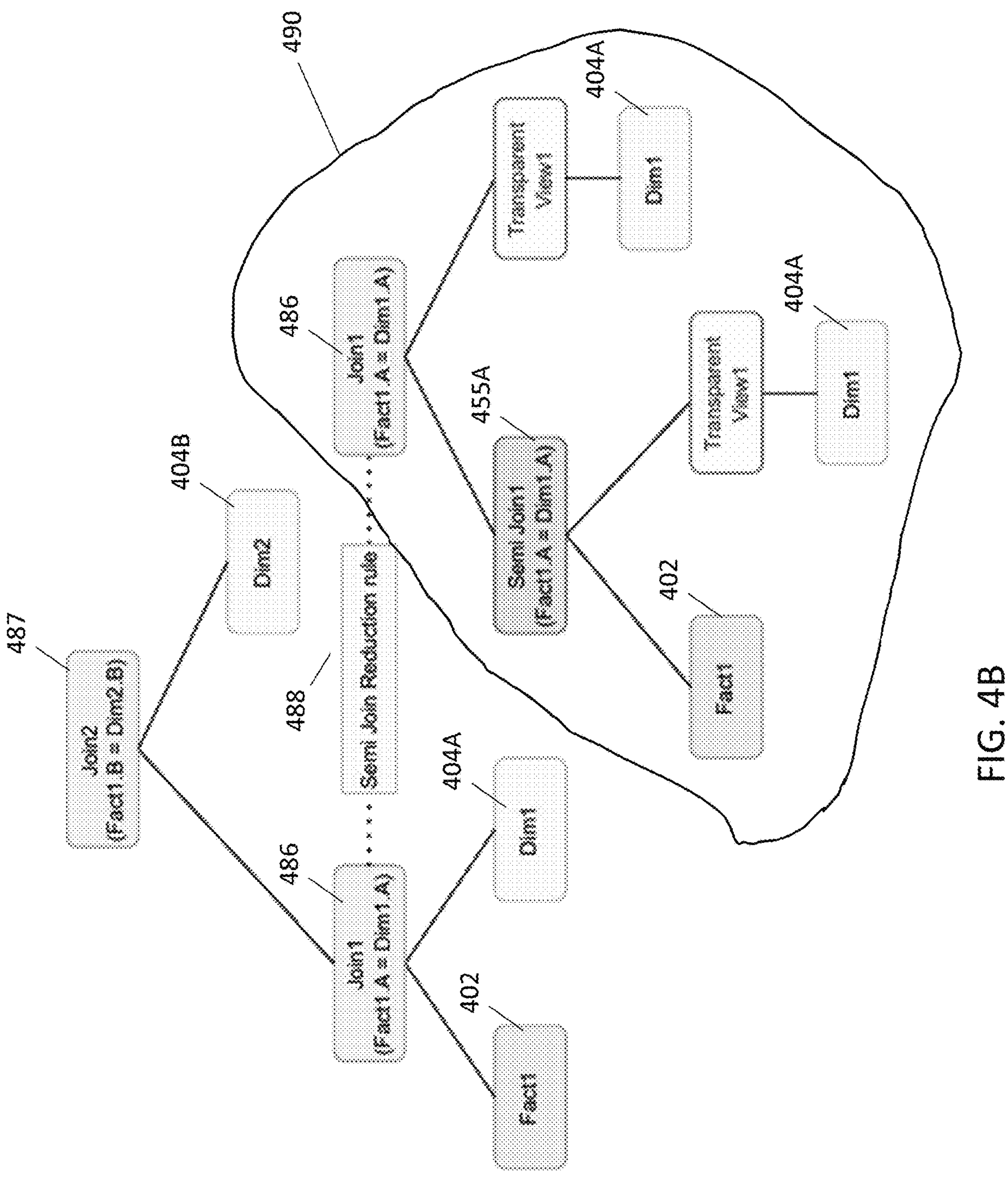

At 306, the optimization process may continue by applying a semi-join reduction to the first join 486 (which, e.g., joins the fact table 402 (Fact1) and a reducer table 404A (Dim1). For example, the query optimizer 122 may apply a semi-join reduction at FIG. 4A to the first join 486. FIG. 4B depicts the semi-join reduction 488 being applied to the first join 486 to form 490. At 490, the first join is optimized using the semi-join 455A (Semi Join1) of the fact table 402 and the Dim1 404A, such that semi-join 455A reduces the quantity of rows from Fact1 provided to join 486 when joined with Dim1 404A.

Figure 4C:
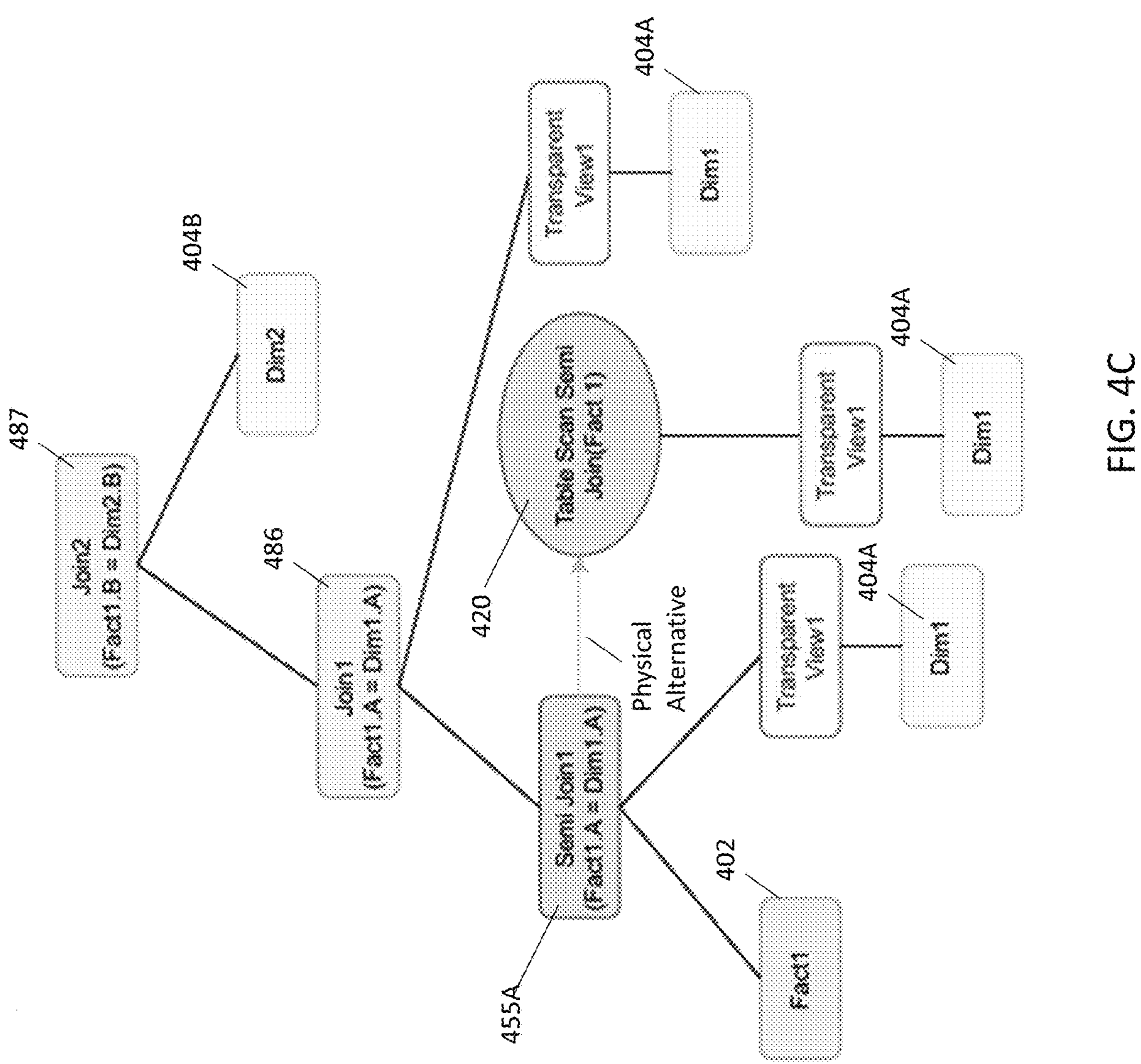

At 308, the optimization process may continue by creating a table scan semi-join (TSSJ) as a physical alternative of the semi-join 455A (Semi Join1). As noted, the query optimizer may create for the query plan's execution a table scan semi-join 420 as a physical alternative to the semi-join 455A (Semi Join1) as depicted at FIG. 4C.

Figure 4D:
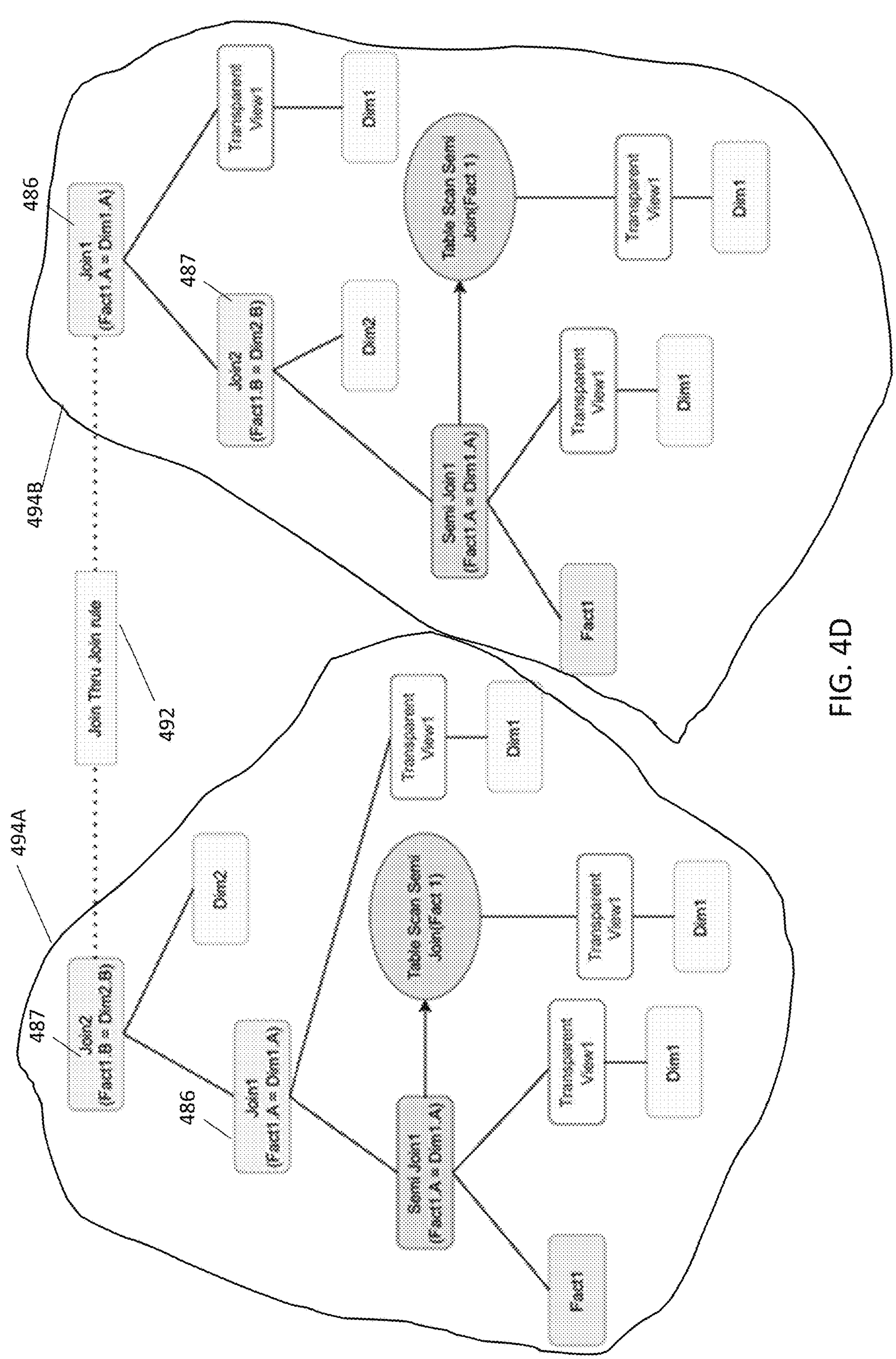

At 310, the optimization process may continue by applying a join thru join to a second Join, such as Join2 487, such that the join thru join changes the order of the second join, such as Join2 487, and the first join, such as Join1 486. In other words, the join thru join swaps or changes the order of Join2 and Join1. Referring to FIG. 4D, the left portion 494A represents the query plan depicted at FIG. 4C with the first join (Join1 486) followed by the second join (Join2 487). After the join thru join 492, the order of the joins changes. Referring to the right portion 494B, the second join (Join2) is performed followed by the first join (Join1 486). In other words, the join thru join changes the order of the joins.

Figure 4E:
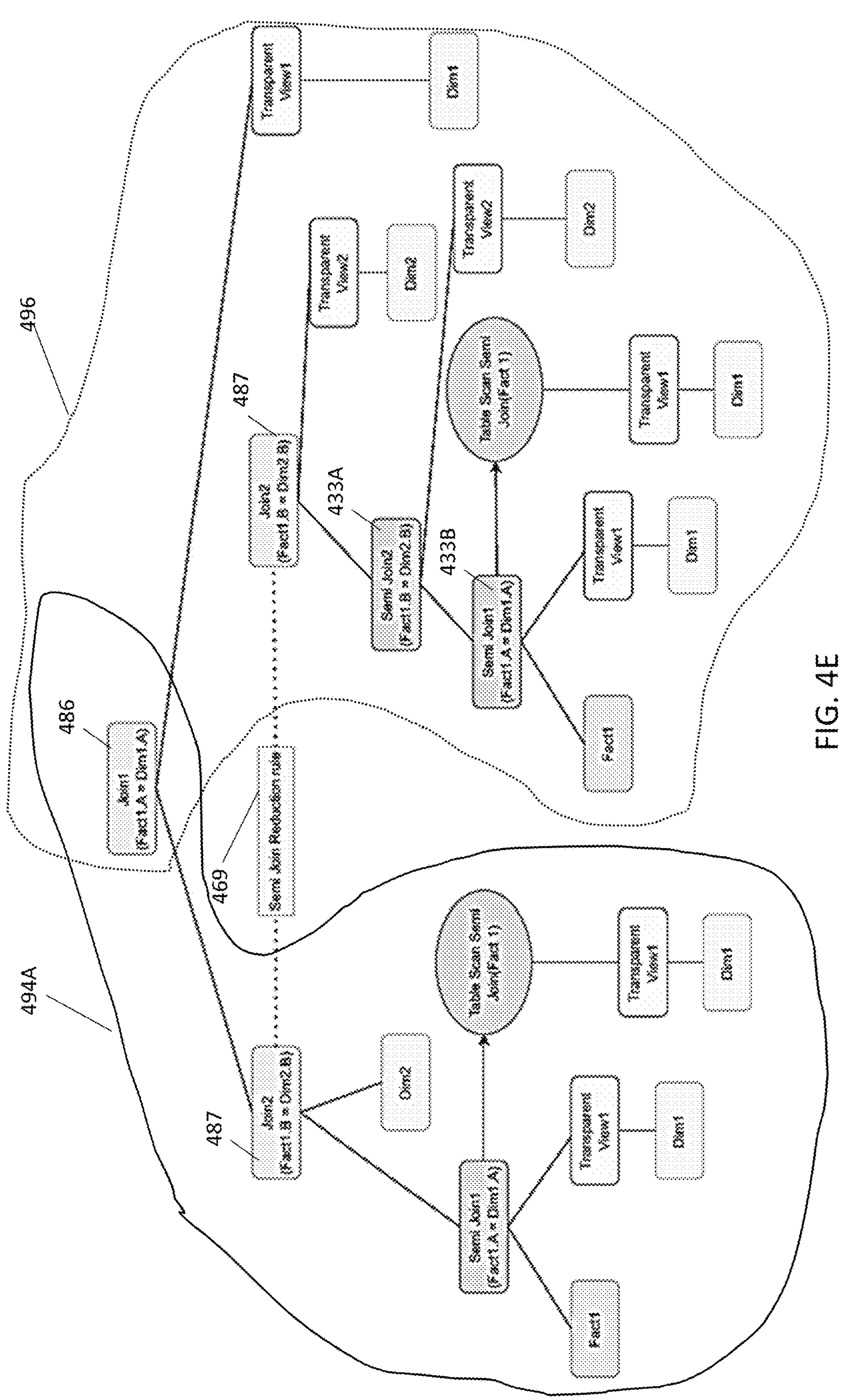

At 312, the optimization process may continue by applying a semi-join reduction to the second join (e.g., Join2) operator, which is above the first semi-join. Referring to FIG. 4E at the left portion 494A, this represents the query plan at FIG. 4D after the join thru join changed the order of the Join1 486 and Join2 487, such that Join2 is below (performed before) Join1. Referring to FIG. 4E at the right portion 496, this represents the query plan after the semi-join reduction 469 is applied to the second join (Join2 433A) which is above the first semi join 433B.

At this point in the optimization process, there may be a bottom up stacking up in the search space during logical enumeration of the logical query plan that contains a stack of at least two semi-joins. For example, the process (at, e.g., 306, 310, and 312) may indicate how the query optimizer can build a stack of semi joins from bottom to top (of, e.g., an abstract syntax tree), in its search space. Referring to FIG. 4E at the right portion 496, the tree contains two semi joins from the semi join reduction rule in a row. That is, instead of selecting join candidates to apply semi join reduction rule among operators in a subtree and handling the pre-selected join set, the query optimizer decides whether to apply the semi-join reduction rule to a current target join. For the optimization, it is allowed to apply the rule not only for the join above a fact table, but also the one above a semi-join from the semi-join reduction rule. In this way, the query optimizer can accumulate the semi joins in a plan. This allows the plan to obtain a stack of semi-joins in its search space, which is produced by for example 306, 310, and 312. More specifically, the optimizer does not scan the entire or subplan from the top and collect join candidates for the semi-join reduction rule to create a stack of semi-joins on a fact table. Instead, from the bottom of the logical tree, the optimizer checks if it is possible to apply the semi-join reduction rule to the current operator and adds a semi-join if possible. Then, the query optimizer performs logical enumeration on the current operator and its ancestor operators, that is, from bottom to top. During the logical enumeration, (by the join_thru_join rule or other rules) another join may appear right above the semi-join from the semi-join reduction rule. Then a new semi-join is created above it. In this way, a stack of semi-joins is built in the search space (from bottom to top) during logical enumeration. This stack may then lead to a table scan semi join with multiple reducers in physical enumeration.

Figure 4F:
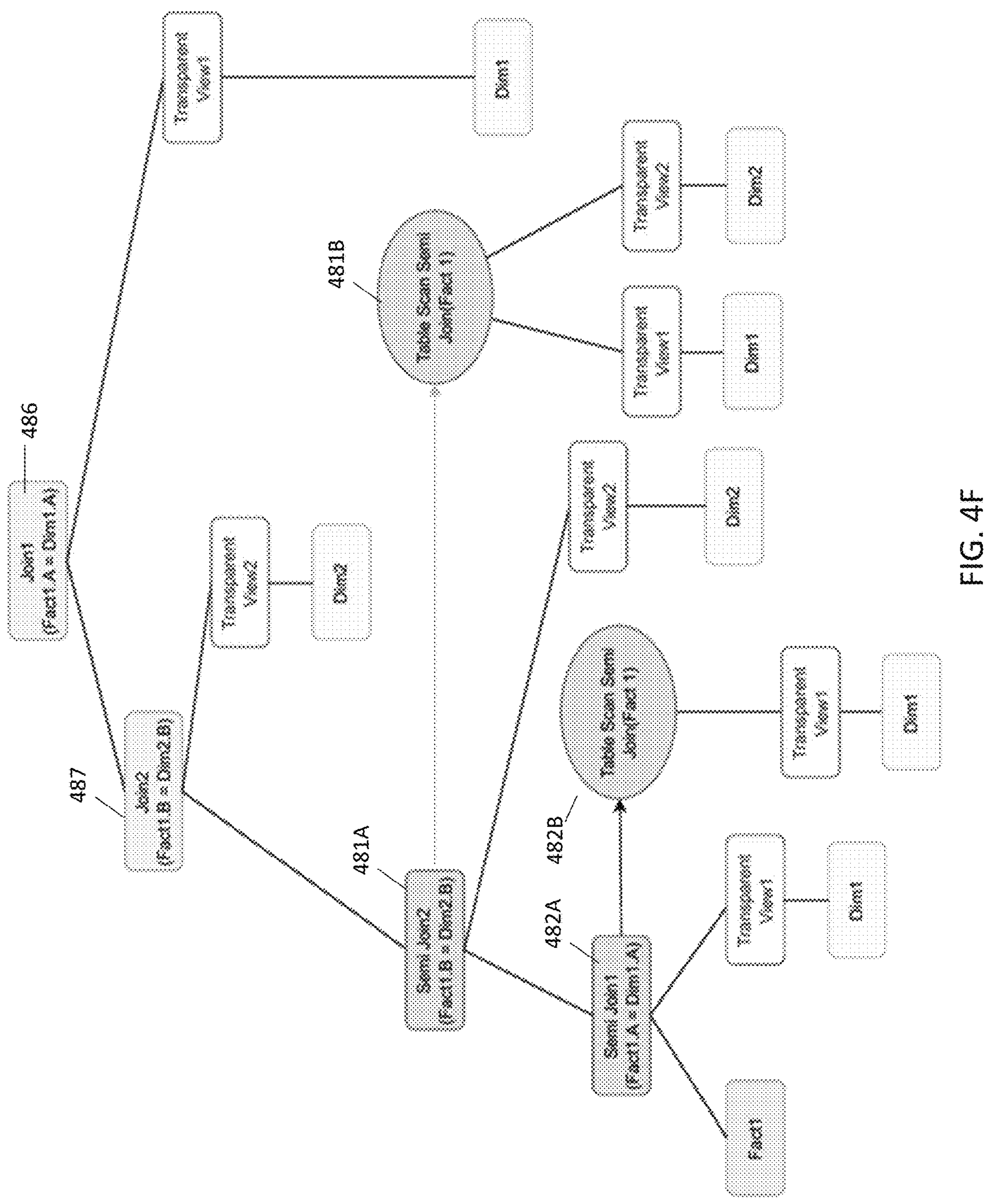

At 316, the optimization process may continue by creating a second table scan semi-join as a physical alternative of the second semi-join operator to absorb the first table scan semi-join. Absorption refers to a mechanism that reuses a pre-existing operator for a new and/or a broader operator. Referring to FIG. 4F, a table scan semi-join 481B is created as a physical alternative of the second semi-join (e.g., SemiJoin2 481A) and absorbing the table scan semi-join (TSSJ) 482B of the first semi-join (e.g., SemiJoin1 482A) and the second semi-join (e.g., SemiJoin2 481A) with DIM1 and DIM2 as children. That is, instead of newly collecting all the information from multiple reducers (DIM1, DIM2), a fact table (Fact1) and joins related to them (Semi Join1, Semi Join2), the query optimizer extracts the information from the pre-existing TSSJ (428B), as it holds information related to Fact1, Dim1 and Semi Join1. Then, what the optimizer needs to consider is only the new operators—Semi Join2 and Dim2. By extracting the information from the TSSJ (428B) (which is a kind of an absorption and dealing with the new information from Semi Join2 and Dim2), the optimizer creates a new operator table scan semi join (481B) such as table scan semi-join with multiple reducers efficiently.

At 318, the logical query plan (which has been optimized by process 300) can be executed. For example, database execution engine may execute the optimized query plan.

Figure 5A:
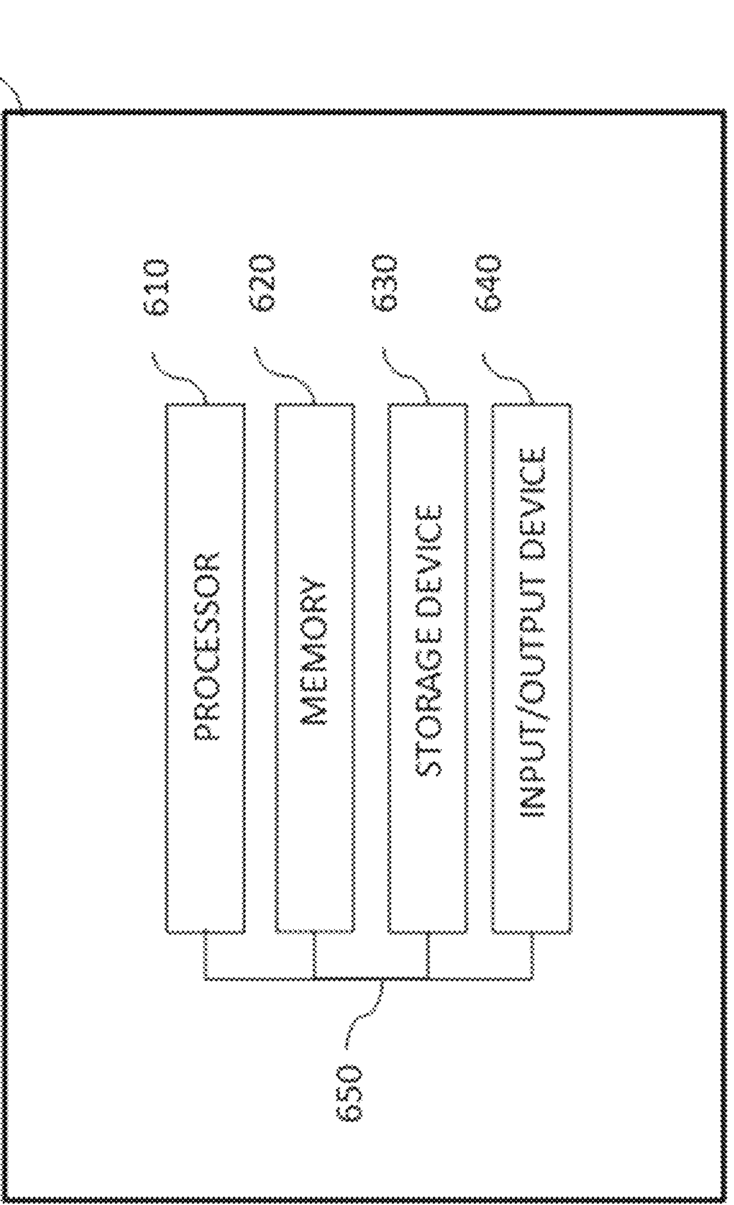
FIGS. 5A and 5B depict additional block diagrams for a system, in accordance with some example embodiments.

In some implementations, the current subject matter may be configured to be implemented in a system 600, as shown in FIG. 5A. The system may be used to provide one or more aspects disclosed herein, such as an execution engine or query optimizer or other components used to cause one or more of the operations of the computer-implemented method of FIG. 3, for example. The system 600 may include a processor 610, a memory 620, a storage device 630, and an input/output device 640. Each of the components (e.g., processor 610, memory 620, storage device 630, and input/output device 640) may be interconnected using a system bus 650. The processor 610 may be configured to process instructions for execution within the system 600. In some implementations, the processor 610 may be a single-threaded processor. In alternate implementations, the processor 610 may be a multi-threaded processor. The processor 610 may be further configured to process instructions stored in the memory 620 or on the storage device 630, including receiving or sending information through the input/output device 640. The memory 620 may store information within the system 600. In some implementations, the memory 620 may be a computer readable medium. In alternate implementations, the memory 620 may be a volatile memory unit. In yet some implementations, the memory 620 may be a non-volatile memory unit. The storage device 630 may be capable of providing mass storage for the system 600. In some implementations, the storage device 630 may be a computer readable medium. In alternate implementations, the storage device 630 may be a floppy disk device, a hard disk device, an optical disk device, a tape device, non-volatile solid state memory, or any other type of storage device. The input/output device 640 may be configured to provide input/output operations for the system 600. In some implementations, the input/output device 640 may include a keyboard and/or pointing device. In alternate implementations, the input/output device 640 may include a display unit for displaying graphical user interfaces.

Figure 5B:
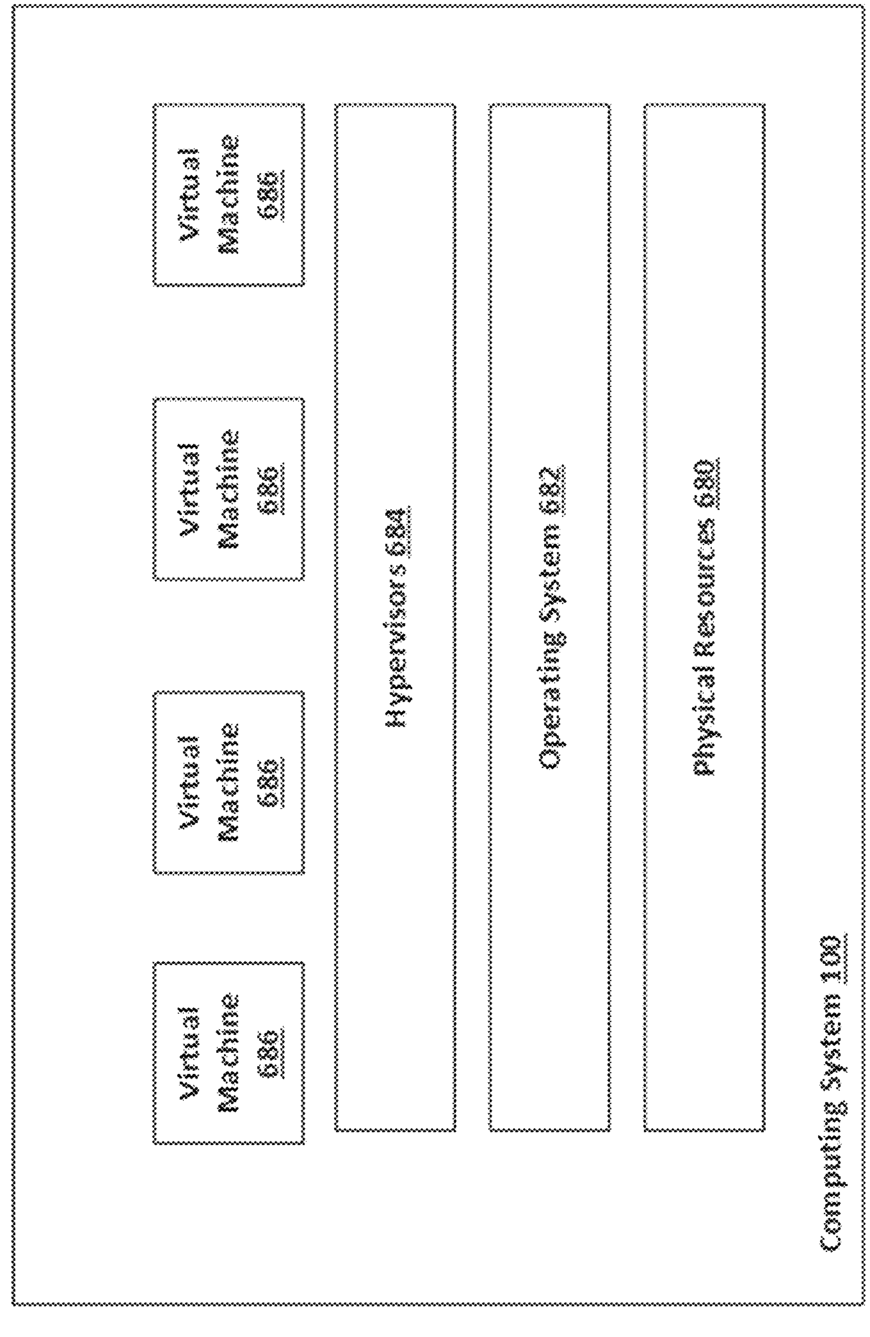

FIG. 5B depicts an example implementation of the system 600 (of FIG. 3). The system 600 may be implemented using various physical resources 880, such as at least one or more hardware servers, at least one storage, at least one memory, at least one network interface, and the like. The system 600 may also be implemented using infrastructure, as noted above, which may include at least one operating system 882 for the physical resources 880 and at least one hypervisor 884 (which may create and run at least one virtual machine 886).

In view of the above-described implementations of subject matter this application discloses the following list of examples, wherein one feature of an example in isolation or more than one feature of said example taken in combination and, optionally, in combination with one or more features of one or more further examples are further examples also falling within the disclosure of this application.

Example 1: A computer-implemented method comprising:

generating a logical query plan for a query that includes a single fact table and multiple reducer tables;

optimizing the logical query plan for query execution by at least:

applying to the logical query plan a first semi-join reduction to a first join that joins the single fact table with at least a first reducer table, creating a first table scan semi-join as a physical alternative to a first semi-join operator formed by the first semi-join reduction, applying a join thru join to a second join to change an order of the first join operator and a second join operator in the logical query plan, and applying a second semi-join reduction to the second join operator above the first semi-join operator, and creating a second table scan semi-join as a physical alternative of the second semi-join operator to absorb the first table scan semi-join; and executing the optimized logical query plan.

Example 2: The computer-implemented method of Example 1, wherein the query includes a join of the single fact table with each of the multiple reducer tables.

Example 3: The computer-implemented method of any of Examples 1-2, further comprising:

receiving the query that includes a query operator for the single fact table and the multiple reducer tables including the first reducer table.

Example 4: The computer-implemented method of any of Examples 1-3, wherein the logical query plan is generated in response to the received query.

Example 5: The computer-implemented method of any of Examples 1-4, wherein the generating the logical query plan comprises generating an abstract syntax tree including the single fact table and the multiple reducer tables.

Example 6: The computer-implemented method of any of Examples 1-5, wherein the first semi-join reduction applied to the first join that joins the single fact table with at least the first reducer table reduces a quantity of rows from the single fact table provided to the first join when joined with the first reducer table.

Example 7: The computer-implemented method of any of Examples 1-6, wherein the first table scan semi-join is registered as the physical alternative to the semi-join operator to enable execution of the table scan semi-join at the executing of the optimized logical query plan.

Example 8: A system comprising:

at least one processor; and at least one memory including program code which when executed by the at least one processor causes operations comprising:

generating a logical query plan for a query that includes a single fact table and multiple reducer tables;

optimizing the logical query plan for query execution by at least:

applying to the logical query plan a first semi-join reduction to a first join that joins the single fact table with at least a first reducer table, creating a first table scan semi-join as a physical alternative to a first semi-join operator formed by the first semi-join reduction, applying a join thru join to a second join to change an order of the first join operator and a second join operator in the logical query plan, and applying a second semi-join reduction to the second join operator above the first semi-join operator, and creating a second table scan semi-join as a physical alternative of the second semi-join operator to absorb the first table scan semi-join; and executing the optimized logical query plan.

Example 9: The system of Example 8, wherein the query includes a join of the single fact table with each of the multiple reducer tables.

Example 10: The system of any of Examples 8-9, further comprising:

receiving the query that includes a query operator for the single fact table and the multiple reducer tables including the first reducer table.

Example 11: The system of any of Examples 8-10, wherein the logical query plan is generated in response to the received query.

Example 12: The system of any of Examples 8-11, wherein the generating the logical query plan comprises generating an abstract syntax tree including the single fact table and the multiple reducer tables.

Example 13: The system of any of Examples 8-12, wherein the first semi-join reduction applied to the first join that joins the single fact table with at least a first reducer table reduces a quantity of rows from the single fact table provided to the first join when joined with the first reducer table.

Example 14: The system of any of Examples 8-13, wherein the table scan semi-join is registered as the physical alternative to the semi-join operator to enable execution of the table scan semi-join at the executing of the optimized logical query plan.

Example 15: The system of any of Examples 8-14, wherein the optimizing the logical query plan for query execution further comprises:

performing a bottom up stacking up in a search space during logical enumeration of the logical query plan that contains a stack of at least the first join and the second join; and further optimizing the logical query plan by absorption of at least the table scan semi-join.

Example 16: A non-transitory computer readable storage medium program code which when executed by at least one processor causes operations comprising:

generating a logical query plan for a query that includes a single fact table and multiple reducer tables;

optimizing the logical query plan for query execution by at least:

applying to the logical query plan a first semi-join reduction to a first join that joins the single fact table with at least a first reducer table, creating a first table scan semi-join as a physical alternative to a first semi-join operator formed by the first semi-join reduction, applying a join thru join to a second join to change an order of the first join operator and a second join operator in the logical query plan, and applying a second semi-join reduction to the second join operator above the first semi-join operator, and creating a second table scan semi-join as a physical alternative of the second semi-join operator to absorb the first table scan semi-join; and executing the optimized logical query plan.

Example 17: The non-transitory computer readable storage medium of Example 16, wherein the query includes a join of the single fact table with each of the multiple reducer tables.

Example 18: The non-transitory computer readable storage medium of any of Examples 16-17, further comprising:

receiving the query that includes a query operator for the single fact table and the multiple reducer tables including the first reducer table.

Example 19: The non-transitory computer readable storage medium of any of Examples 16-18, wherein the logical query plan is generated in response to the received query.

Example 20: The non-transitory computer readable storage medium of any of Examples 16-19, wherein the generating the logical query plan comprises generating an abstract syntax tree including the single fact table and the multiple reducer tables, and wherein the first semi-join reduction applied to the first join that joins the single fact table with at least a first reducer table reduces a quantity of rows from the single fact table provided to the first join when joined with the first reducer table.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term “machine-readable medium” (also referred to as non-transitory computer readable storage medium) refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term “machine-readable signal” refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations may be within the scope of the following claims.

The illustrated methods are exemplary only. Although the methods are illustrated as having a specific operational flow, two or more operations may be combined into a single operation, a single operation may be performed in two or more separate operations, one or more of the illustrated operations may not be present in various implementations, and/or additional operations which are not illustrated may be part of the methods.

What is claimed is:

1. A computer-implemented method comprising:

generating, using a query optimizer of a database management system, a logical query plan for a structured query language (SQL) query that includes a join of a single fact table with each of multiple reducer tables, wherein generating the logical query plan comprises generating a first syntax tree including the single fact table and the multiple reducer tables;

optimizing, using the query optimizer, the logical query plan for query execution by at least:

applying to the logical query plan a first semi-join reduction to a first join operator that joins the single fact table with at least a first reducer table of the multiple reducer tables, creating a first table scan semi-join operator as a physical alternative to a first semi-join operator formed by the first semi-join reduction, applying a join thru join to a second join operator to change an order of the first join operator and the second join operator in the logical query plan, applying a second semi-join reduction to the second join operator above the first semi-join operator, and creating a second table scan semi-join operator as a physical alternative to a second semi-join operator to absorb the first table scan semi-join operator, wherein the optimizing of the logical query plan produces an optimized second syntax tree different from the first syntax tree; and executing, using a query execution engine of the database management system and based on executable code received from a query compiler, the optimized logical query plan in accordance with the optimized second syntax free to execute the SQL query, wherein each of the first join operator, the second join operator, the first semi-join operator, the second semi-join operator, the first table scan semi-join operator, and the second table scan semi-join operator is a SQL operator executed at runtime of the SQL query.

2. The computer-implemented method of claim 1, further comprising:

receiving the query that includes a query operator for the single fact table and the multiple reducer tables including the first reducer table.

3. The computer-implemented method of claim 2, wherein the logical query plan is generated in response to the received query.

4. The computer-implemented method of claim 1, wherein the first semi-join reduction applied to the first join operator that joins the single fact table with at least the first reducer table reduces a quantity of rows from the single fact table provided to the first join operator when joined with the first reducer table.

5. The computer-implemented method of claim 1, wherein the first table scan semi-join operator is registered as the physical alternative to the first semi-join operator to enable execution of the first table scan semi-join operator at the executing of the optimized logical query plan.

6. A system comprising:

at least one processor; and at least one memory including program code which when executed by the at least one processor causes operations comprising:

generating, using a query optimizer of a database management system, a logical query plan for a structured query language (SQL) query that includes a join of a single fact table with each of multiple reducer tables, wherein generating the logical query plan comprises generating a first syntax tree including the single fact table and the multiple reducer tables;

optimizing, using the query optimizer, the logical query plan for query execution by at least:

applying to the logical query plan a first semi-join reduction to a first join operator that joins the single fact table with at least a first reducer table of the multiple reducer tables, creating a first table scan semi-join operator as a physical alternative to a first semi-join operator formed by the first semi-join reduction, applying a join thru join to a second join operator to change an order of the first join operator and the second join operator in the logical query plan, applying a second semi-join reduction to the second join operator above the first semi-join operator, and creating a second table scan semi-join operator as a physical alternative to a second semi-join operator to absorb the first table scan semi-join operator, wherein the optimizing of the logical query plan produces an optimized second syntax tree different from the first syntax tree; and executing, using a query execution engine of the database management system and based on executable code received from a query compiler, the optimized logical query plan in accordance with the optimized second syntax tree to execute the SQL query, wherein each of the first join operator, the second join operator, the first semi-join operator, the second semi-join operator, the first table scan semi-join operator, and the second table scan semi-join operator is a SQL operator executed at runtime of the SQL query.

7. The system of claim 6, further comprising:

receiving the query that includes a query operator for the single fact table and the multiple reducer tables including the first reducer table.

8. The system of claim 7, wherein the logical query plan is generated in response to the received query.

9. The system of claim 6, wherein the first semi-join reduction applied to the first join operator that joins the single fact table with at least a first reducer table reduces a quantity of rows from the single fact table provided to the first join operator when joined with the first reducer table.

10. The system of claim 6, wherein the table scan semi-join operator is registered as the physical alternative to the first semi-join operator to enable execution of the first table scan semi-join operator at the executing of the optimized logical query plan.

11. The system of claim 6, wherein the optimizing the logical query plan for query execution further comprises:

performing a bottom up stacking up in a search space during logical enumeration of the logical query plan that contains a stack of at least the first join operator and the second join operator; and further optimizing the logical query plan by absorption of at least the first table scan semi-join operator.

12. A non-transitory computer readable storage medium storing program code which when executed by at least one processor causes operations comprising:

generating, using a query optimizer of a database management system, a logical query plan for a structured query language (SQL) query that includes a join of a single fact table with each of multiple reducer tables, wherein generating the logical query plan comprises generating a first syntax tree including the single fact table and the multiple reducer tables;

optimizing, using the query optimizer, the logical query plan for query execution by at least:

applying to the logical query plan a first semi-join reduction to a first join operator that joins the single fact table with at least a first reducer table of the multiple reducer tables, creating a first table scan semi-join operator as a physical alternative to a first semi-join operator formed by the first semi-join reduction, applying a join thru join to a second join operator to change an order of the first join operator and the second join operator in the logical query plan, applying a second semi-join reduction to the second join operator above the first semi-join operator, and creating a second table scan semi-join operator as a physical alternative to a second semi-join operator to absorb the first table scan semi-join operator, wherein the optimizing of the logical query plan produces an optimized second syntax tree different from the first syntax tree; and executing, using a query execution engine of the database management system and based on executable code received from a query compiler, the optimized logical query plan in accordance with the optimized second syntax free to execute the SQL query, wherein each of the first join operator, the second join operator, the first semi-join operator, the second semi-join operator, the first table scan semi-join operator, and the second table scan semi-join operator is a SQL operator executed at runtime of the SQL query, and wherein the non-transitory computer readable storage medium excludes storing the program code in a signal form.

13. The non-transitory computer readable storage medium of claim 12, further comprising:

receiving the query that includes a query operator for the single fact table and the multiple reducer tables including the first reducer table.

14. The non-transitory computer readable storage medium of claim 13, wherein the logical query plan is generated in response to the received query.

15. The non-transitory computer readable storage medium of claim 12, wherein the first semi-join reduction applied to the first join operator that joins the single fact table with at least a first reducer table reduces a quantity of rows from the single fact table provided to the first join operator when joined with the first reducer table.

* * * * *